(12) United States Patent  
Schroeder et al.

(10) Patent No.: US 9,470,351 B2
(45) Date of Patent: Oct. 18, 2016

(54) CRIMP FITTING HAVING REVERSED BARBS

(71) Applicant: VISTEON GLOBAL TECHNOLOGIES, INC., Van Buren Township, MI (US)

(72) Inventors: Fred Georg Schroeder, Grosse Ile, MI (US); Augustin Machynak, Senov u Noveho Jicina (CZ)

(73) Assignee: Hanon Systems, Daejeon-si (KR)

( * ) Notice: Subject to any disclaimer, the term of this patent is extended or adjusted under 35 U.S.C. 154(b) by 125 days.

(21) Appl. No.: 13/792,848

(22) Filed: Mar. 11, 2013

(65) Prior Publication Data

US 2014/0252761 A1    Sep. 11, 2014

(51) Int. Cl.
*F16L 33/18*      (2006.01)
*F16L 33/22*      (2006.01)
*F16L 33/207*     (2006.01)

(52) U.S. Cl.
CPC .......... *F16L 33/225* (2013.01); *F16L 33/2073* (2013.01)

(58) Field of Classification Search
USPC ............................. 285/242, 256, 382, 382.7
See application file for complete search history.

(56) References Cited

U.S. PATENT DOCUMENTS

| 3,017,203 | A | * | 1/1962 | MacLeod | 285/256 |
| 5,358,012 | A | * | 10/1994 | Kish | 138/109 |
| 5,382,059 | A | | 1/1995 | Wilson | |
| 5,797,629 | A | * | 8/1998 | Beagle | 285/256 |
| 5,944,359 | A | | 8/1999 | Andronaco | |
| 6,237,963 | B1 | | 5/2001 | Hall | |
| 7,293,804 | B2 | | 11/2007 | Li et al. | |
| 7,364,206 | B2 | | 4/2008 | Romanelli et al. | |
| 7,384,074 | B2 | | 6/2008 | He | |
| 7,429,065 | B2 | * | 9/2008 | Alder et al. | 285/259 |
| 7,488,008 | B2 | | 2/2009 | Hawkins | |
| 7,566,078 | B2 | * | 7/2009 | Piccinali | 285/256 |
| 2002/0024218 | A1 | * | 2/2002 | Manuli | 285/256 |
| 2004/0032124 | A1 | * | 2/2004 | Lefere et al. | 285/242 |
| 2005/0001424 | A1 | | 1/2005 | Watanabe | |
| 2006/0006643 | A1 | | 1/2006 | Schultz | |
| 2006/0220378 | A1 | * | 10/2006 | Li et al. | 285/242 |
| 2007/0096461 | A1 | | 5/2007 | Owens | |
| 2008/0036202 | A1 | * | 2/2008 | Baxi et al. | 285/256 |
| 2008/0302467 | A1 | | 12/2008 | Mukawa et al. | |
| 2009/0256353 | A1 | * | 10/2009 | Thrift et al. | 285/256 |

(Continued)

FOREIGN PATENT DOCUMENTS

CN    102705614 A    10/2012
EP    0066742 A1    12/1982

(Continued)

*Primary Examiner* — Aaron Dunwoody
*Assistant Examiner* — Fannie Kee
(74) *Attorney, Agent, or Firm* — Fraser Clemens Martin & Miller LLC; James D. Miller

(57) ABSTRACT

A crimp fitting for a hose member including a nipple and a socket coupled thereto. The nipple has an outer surface provided with a plurality of axially extending reverse angled first barbs and a plurality of axially extending forward angled second barbs alternatingly formed thereon. The first barbs are configured to engage an inner surface of a hose member to increase a sealing engagement between the nipple and the hose member, and the second barbs are configured to engage the inner surface of the hose member to militate against a disengagement of the nipple from the hose member.

8 Claims, 2 Drawing Sheets

(56) References Cited

U.S. PATENT DOCUMENTS

| | | |
|---|---|---|
| 2011/0101680 A1 | 5/2011 | Menor |
| 2012/0167655 A1 | 7/2012 | Arn |
| 2012/0169047 A1 | 7/2012 | Arn et al. |
| 2012/0211977 A1 | 8/2012 | Callahan et al. |
| 2012/0298242 A1 | 11/2012 | Casella et al. |

FOREIGN PATENT DOCUMENTS

| | | |
|---|---|---|
| EP | 66742 A1 * | 12/1982 |
| JP | 1969023492 | 10/1969 |
| JP | S51-31114 U | 3/1976 |
| JP | S52-116713 U | 9/1977 |
| JP | S54-65818 A | 5/1979 |
| JP | S59-113589 U | 7/1984 |
| JP | 1985159492 | 8/1985 |
| JP | 1991093683 | 9/1991 |
| JP | 1999013970 | 1/1999 |
| JP | 2006189159 A | 7/2006 |
| JP | 2011102605 | 5/2011 |
| KR | 1020040094392 A | 11/2004 |
| KR | 1020090127551 A | 12/2009 |
| WO | 9519520 A1 | 7/1995 |

* cited by examiner

CRIMP FITTING HAVING REVERSED BARBS

FIELD OF THE INVENTION

The present invention relates generally to a crimp fitting for hoses and, more particularly, to a crimp fitting having reversed barbs.

BACKGROUND OF THE INVENTION

Fittings utilized with a flexible hose usually include a nipple component which is received within the hose bore and a socket. The socket is usually coupled to the nipple in such a manner so as to militate against an axial movement thereof. Typically, the socket includes a cylindrical portion radially spaced from the nipple and in axial alignment therewith. An annular chamber is defined between the nipple and the socket which receives an end of the hose.

The hose disposed in the annular chamber defined by the nipple and the socket may be retained therein by several techniques. For instance, adhesive may be used to bond the hose within the socket, serrations may be formed on an inner surface of the nipple or the socket, or the socket may be crimped to compress the hose onto the nipple. Also, combinations of the techniques may be utilized, such as employing serrations upon the inner surface of the socket and crimping the socket onto the hose. The current techniques provide adequate retention of the hose. However, a connection formed between the crimp fitting and the hose is susceptible to leakage, especially as a fluid pressure within the hose increases.

Accordingly, it would be desirable to produce a crimp fitting which is economical to manufacture, easy to machine, and forms a substantially fluid-tight connection with the hose which is capable of withstanding variable fluid pressures.

SUMMARY OF THE INVENTION

In concordance and agreement with the present disclosure, a crimp fitting which is economical to manufacture, easy to form or machine, and forms a substantially fluid-tight connection with the hose which is capable of withstanding variable fluid pressures, has surprisingly been discovered.

In one embodiment, a crimp fitting, comprises: a nipple including a socket coupled thereto and an outer surface having at least one axially extending reverse angled first barb and at least one axially extending forward angled second barb, the at least one second barb is spaced apart from the at least one first barb forming an annular groove therebetween, wherein the groove is configured to receive a hose member therein and axially aligned with a portion of the socket configured to be deformed by a crimping apparatus.

In another embodiment, a crimp fitting, comprises: a nipple including a socket coupled thereto and an outer surface having a plurality of paired barb configurations formed thereon, each of the paired barb configurations includes an axially extending reverse angled first barb and an axially extending forward angled second barb spaced apart from the first barb forming an annular groove therebetween, wherein one of the paired barb configurations abuts another one of the paired barb configurations.

In yet a further embodiment, a crimp fitting, comprises: a nipple including a socket coupled thereto and an outer surface having a plurality of axially extending reverse angled first barbs and a plurality of axially extending forward angled second barbs alternatingly formed thereon, wherein at least one the first barbs has an edge configured to engage an inner surface of a hose member to increase a sealing engagement between the nipple and the hose member, and at least one of the second barbs has an edge configured to engage the inner surface of the hose member to militate against a disengagement of the nipple from the hose member.

BRIEF DESCRIPTION OF THE DRAWINGS

The above, as well as other objects and advantages of the invention, will become readily apparent to those skilled in the art from a reading of the following detailed description of the invention when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Various features of the invention can be utilized in any application or system that conveys a fluid, especially a fluid under pressure, such as an automotive air conditioning system or a power steering system of a vehicle, for example.

FIGS. 1-6 show a crimp fitting 10 according to the present invention. The crimp fitting 10 includes a nipple 12 and a generally cylindrical socket 14 radially spaced from the nipple 12 and in axial alignment therewith. Various materials or combinations thereof can be used to form the nipple 12. For example, the nipple 12 can be formed from a substantially rigid metal material such as a steel, copper, or aluminum tubing or the like. It is understood that the nipple 12 can be integrally formed at an end of a conduit 16 or a separate component which is configured to be received onto the end of a hose or the conduit 16. The conduit 16 can be formed from various materials or combinations thereof such as a substantially rigid metal material (e.g. a steel, copper, or aluminum tubing), a substantially flexible polymeric material (e.g. a fabric-reinforced rubber tubing), or the like, for example.

Figure 1:
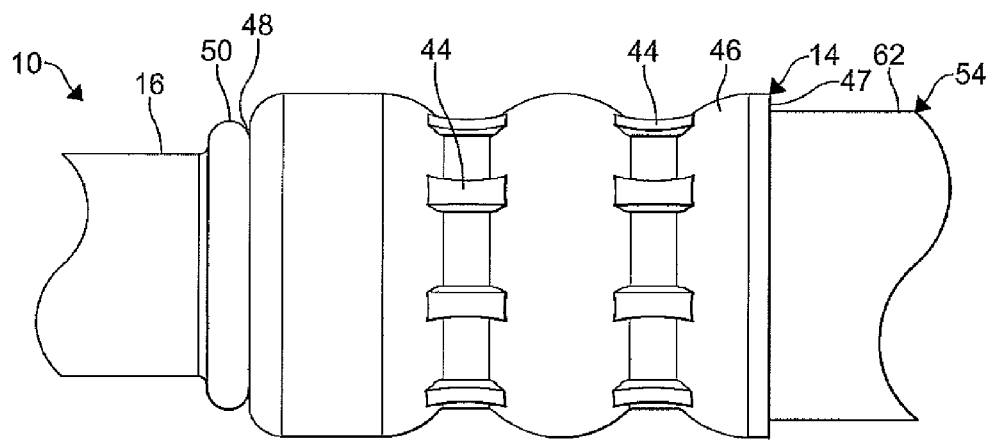
FIG. 1 is a fragmentary side elevational view of a crimp fitting having a pair of spaced apart crimps according to the present invention, showing a hose disposed therein.
Figure 2:
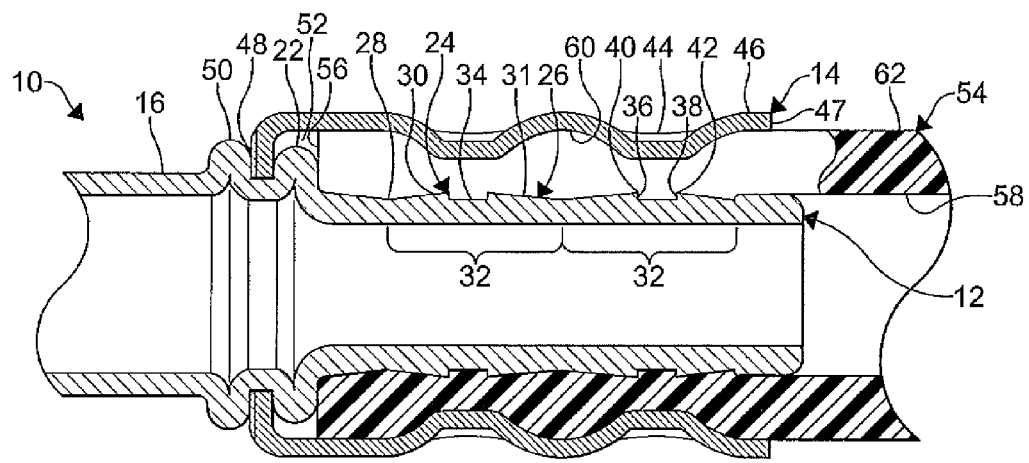
FIG. 2 is a fragmentary cross-sectional elevational view of the crimp fitting illustrated in FIG. 1 according to an embodiment of the invention, showing a portion of the hose cutaway for clarity.

As illustrated in FIG. 2, the nipple 12 includes a shoulder 22, a plurality of spaced apart, radially outwardly extending reverse angled first barbs 24, and a plurality of spaced apart, radially outwardly extending forward angled second barbs 26 provided on an outer surface 28 thereof. As a non-limiting example, the first barbs 24 have an outer surface 30 formed at an angle in a range of about 5 degrees to about 10 degree with respect to the outer surface 28 of the nipple 12 and the second barbs 26 have an outer surface 31 formed at an angle in a range of about 170 degrees to about 175 degrees with respect to the outer surface 28 of the nipple 12. The barbs 24, 26 may be formed by any suitable forming process such as machining, rolling, or stamping, for example. Each of the first barbs 24 and the second barbs 26 can be formed continuously or at spaced apart intervals about a circumference of the nipple 12. When the barbs 24, 26 are formed at spaced apart intervals about the circumference of the nipple 12, the first barbs 24 may be aligned or radially offset from the second barbs 26 if desired.

Figure 3:
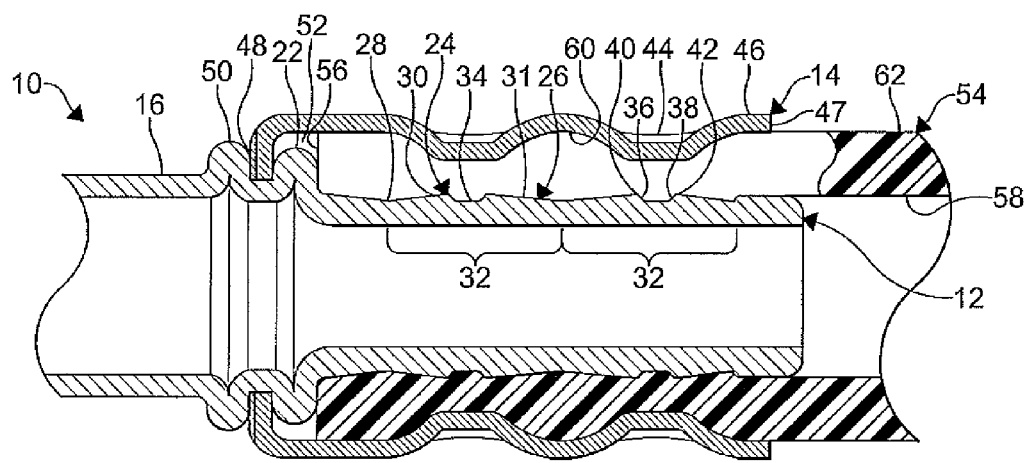
FIG. 3 is a fragmentary cross-sectional elevational view of the crimp fitting illustrated in FIG. 1 according to another embodiment of the invention, showing a portion of the hose cutaway for clarity.
Figure 4:
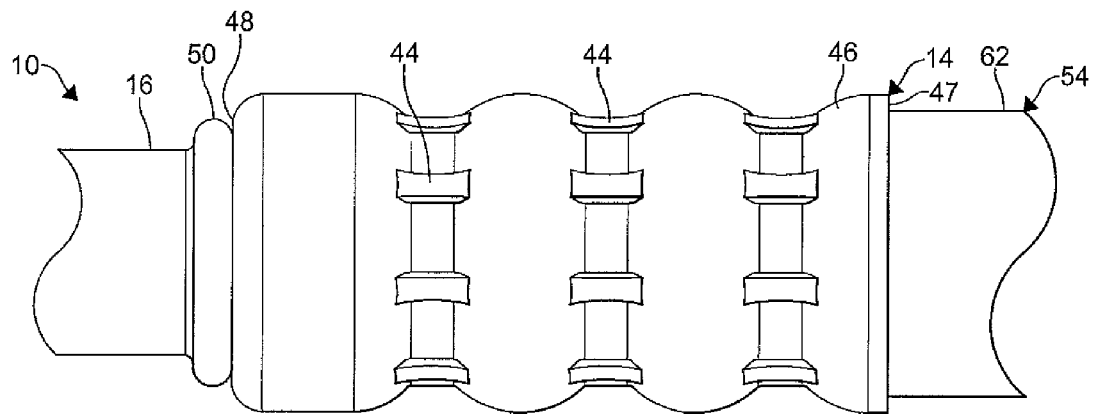
FIG. 4 is a fragmentary side elevational view of a crimp fitting having three spaced apart crimps according to the present invention, showing a hose disposed therein.

In certain embodiments, the first barbs 24 and the second barbs 26 are alternatingly formed on the nipple 12 in an axial direction. Each one of the second barbs 26 is spaced from a corresponding one of the first barbs 24 forming an annular groove 34 therebetween. The first barbs 24, the second barbs 26, and the grooves 34 are arranged to form a plurality of paired barb configurations 32. As illustrated, each of the paired barb configurations 32 abuts an adjacent one of the paired barb configurations 32. Those skilled in the art will appreciate that the nipple 12 can include any number of paired barb configurations 32 as desired such as two paired barb configurations 32 as shown in FIGS. 2-3 or three paired barb configurations 32 as shown in FIGS. 5-6, for example.

Figure 5:
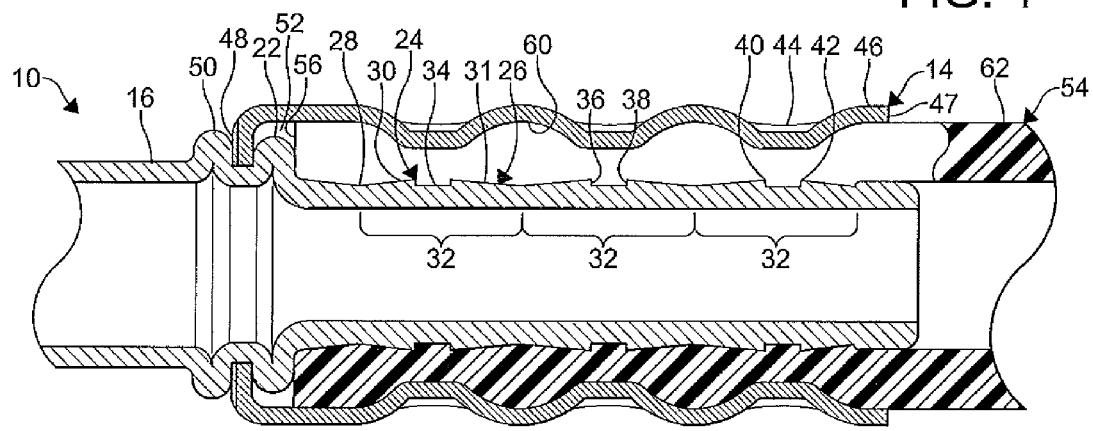
FIG. 5 is a fragmentary cross-sectional elevational view of the crimp fitting illustrated in FIG. 4 according to an embodiment of the invention, showing a portion of the hose cutaway for clarity.
Figure 6:
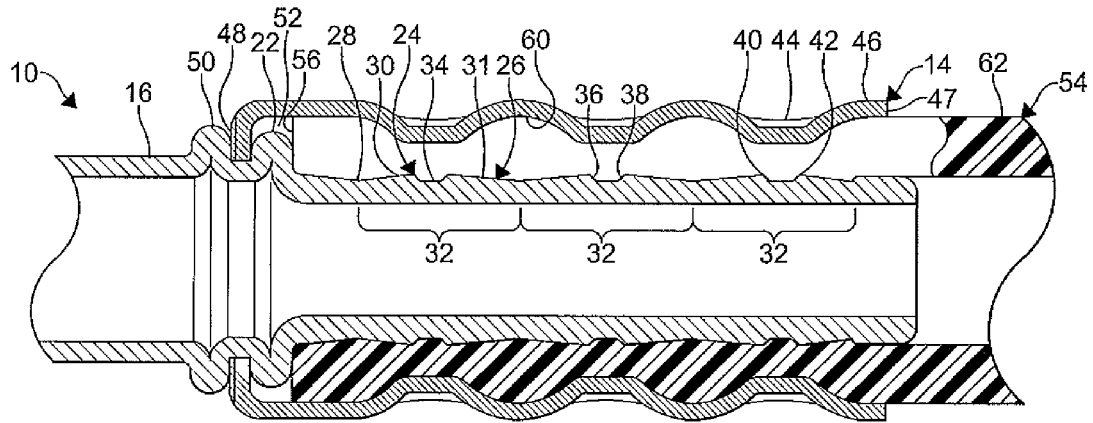
FIG. 6 is a fragmentary cross-sectional elevational view of the crimp fitting illustrated in FIG. 4 according to another embodiment of the invention, showing a portion of the hose cutaway for clarity.

In certain embodiments shown in FIGS. 2 and 5, an inner surface 36 of the first barbs 24 and an inner surface 38 of the second barbs 26 are substantially perpendicular to the outer surface 28 of the nipple 12, forming a generally rectangular shaped groove 34. In other embodiments shown in FIGS. 3 and 6, the inner surface 36 of the first barbs 24 and the inner surface 38 of the second barbs 26 are angled from respective edges 40, 42 to the outer surface 28 of the nipple 12, forming a generally trapezoidal shaped groove 34. Each of the grooves 34 shown is in axial alignment with an annular array of ribs 44 formed on an outer surface 46 of the socket 14. As a non-limiting example, each of the grooves 34 has a depth of in a range of about 0.25 mm to about 0.5 mm, specifically about 0.35 mm, and a width in a range of about 1.5 mm to about 3.5 mm, specifically about 2.0 mm. It is understood that the grooves 34 can have any size and shape as desired.

The socket 14 includes an open end 47 and a terminating end 48. The terminating end 48 is disposed between the shoulder 22 and a formed annular bead 50 of the nipple 12, forming a bead lock to militate against an axial displacement of the socket 14. The socket 14 is formed from a ductile material of suitable strength which permits crimping without material failure. An annular chamber or space 52 is defined between the nipple 12 and socket 14 which receives an end of a hose member 54. The hose member 54 can be formed from various materials or combinations thereof such as a substantially flexible polymeric material (e.g. a fabric-reinforced rubber tubing), or the like, for example. It is understood that the hose member 54 can be any type of hose as desired such as a barrier hose, a veneer hose, and a solid material hose, for example.

To assemble, the nipple 12 is disposed in an open bore of the hose member 54 in such a manner that the hose member 54 is disposed in the annular chamber 52 and an end surface 56 of the hose member 54 abuts the shoulder 22 of the nipple 12. Thereafter, the crimp fitting 10 having the hose member 54 disposed therein, is placed within a conventional socket crimping or swaging apparatus (not shown). In the crimping apparatus, the socket 14 is radially deformed inwardly at the ribs 44 to compress the hose member 54 upon the nipple 12, sandwiching the hose member 54 between the socket 14 and the nipple 12 to form a substantially fluid-tight connection and militate against disengagement of the crimp fitting 10 from the hose member 54. As illustrated in FIGS. 2-3 and 5-6, portions of the hose member 54 are received in the grooves 34 formed between the barbs 24, 26 to further enhance the substantially fluid-tight connection between the crimp fitting 10 and the hose member 54. Additionally, the edges 40 of the first barbs 24 engage or "bite into" an inner surface 58 of the hose member 54 to further enhance the substantially fluid-tight connection between the crimp fitting 10 and the hose member 54, especially as a fluid pressure within the hose member 54 increases. Accordingly, the first barbs 24 increase a sealing engagement of the nipple 12 with the hose member 54, thereby militating against undesired leakage of the connection between the crimp fitting 10 and the hose member 54.

Similarly, the second barbs 26 of the nipple 12 engage the inner surface 58 of the hose member 54. The second barbs 26 provide a positive resistance for militating against disengagement of the nipple 12 therefrom. It is understood that an inner surface 60 of the socket 14 and/or an outer surface 62 of the hose member 54 may include at least one surface irregularity (e.g. knurling) to further enhance the substantially fluid-tight connection between the crimp fitting 10 and the hose member 54, so as to further militate against disengagement therebetween. It is also understood that an adhesive may be employed between the nipple 12 and the hose member 54 and/or between the hose member 54 and the socket 14 to further enhance the sealing engagement of the nipple 12 with the hose member 54 and further militate against disengagement therebetween. The crimp fitting 10, as described above, is capable of effectively handling relatively high internal hose pressures, and the fact that the crimp fitting 10 includes the reversed first barbs 24 and forward second barbs 26 in an alternating pattern provides a hose connection unparalleled in the crimp fitting art.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A crimp fitting assembly configured for deformation by a crimping apparatus, comprising:
a nipple including an outer surface having a plurality of paired barb configurations formed thereon, each of the paired barb configurations including an axially extending reverse angled first barb and an axially extending forward angled second barb spaced apart from the first barb forming an annular groove therebetween, the first barb and the second barb of the paired barb configurations alternatingly formed on the outer surface of the nipple;
a hose member having a bore formed therein, the nipple at least partially received in the bore of the hose member; and a socket coupled to the nipple and at least partially surrounding the hose member, the socket deformed by the crimping apparatus to form at least one radially inwardly extending deformed portion to compress the hose member upon the annular groove of at least one of the paired barb configurations, the socket including an annular array of ribs formed on an outer surface thereof, each of the ribs formed only on portions of the outer surface of the socket in axial alignment with at least one of the at least one radially inwardly extending deformed portions, wherein one of the paired barb configurations abuts another one of the paired barb configurations, wherein the annular groove of each of the paired barb configurations is axially aligned with a corresponding one of the radially inwardly extending deformed portions, and wherein each of the paired barb configurations has a symmetric structure of the first barb and the second barb formed by the annular groove having a generally rectangular cross-sectional shape.

2. The crimp fitting of claim 1, wherein the first barb of each of the paired barb configurations has an edge formed by an inner surface and an outer surface.

3. The crimp fitting of claim 2, wherein the outer surface of the first barb of each of the paired barb configurations is formed at an angle in a range of about 5 degrees to about 10 degrees with respect to the outer surface of the nipple.

4. The crimp fitting of claim 2, wherein the second barb of each of the paired barb configurations has an edge formed by an inner surface and an outer surface, wherein the edge of the first barb of each of the paired barb configurations and the edge of the second barb of each of the paired barb configurations each point in a direction toward the corresponding radially inwardly extending deformed portion of the socket in axial alignment with each corresponding paired barb configuration.

5. The crimp fitting of claim 1, wherein the second barb of each of the paired barb configurations has an edge formed by an inner surface and an outer surface.

6. The crimp fitting of claim 5, wherein the outer surface of the second barb of each of the paired barb configurations is formed at an angle in a range of about 170 degrees to about 175 degrees with respect to the outer surface of the nipple.

7. The crimp fitting of claim 1, wherein the annular groove of each of the paired barb configurations is configured to receive the hose member therein.

8. The crimp fitting of claim 1, wherein each of the paired barb configurations is symmetric about an axis arranged perpendicular to a longitudinal axis of the nipple.

* * * * *